United States Patent [19]
Suzuki

[11] Patent Number: 5,240,094
[45] Date of Patent: Aug. 31, 1993

[54] RATIO CONTROL FOR CONTINUOUSLY VARIABLE TRANSMISSION DURING BRAKING

[75] Inventor: Yutaka Suzuki, Atsugi, Japan

[73] Assignee: Nissan Motor Co., Ltd., Yokohama, Japan

[21] Appl. No.: 827,037

[22] Filed: Jan. 29, 1992

[30] Foreign Application Priority Data

Jan. 29, 1991 [JP] Japan .................................. 3-028050

[51] Int. Cl.⁵ ............................................ F16H 11/06
[52] U.S. Cl. ................................ 192/4 A; 364/426.01; 364/424.1; 474/28
[58] Field of Search ...................... 192/4 A; 364/424.1, 364/426.01; 474/70, 28

[56] References Cited

U.S. PATENT DOCUMENTS

| | | | |
|---|---|---|---|
| 4,735,113 | 4/1988 | Yamamuro et al. | 74/866 |
| 4,823,267 | 4/1989 | Kumura | 364/424.1 |
| 4,967,610 | 11/1990 | Sasajima et al. | 364/424.1 X |
| 5,012,910 | 5/1991 | Miyawaki | 192/4 A |
| 5,101,689 | 4/1992 | Yamaguchi et al. | 474/28 X |

Primary Examiner—Leslie A. Braun
Assistant Examiner—Khoi Q. Ta
Attorney, Agent, or Firm—Foley & Lardner

[57] ABSTRACT

A ratio control for a continuously variable transmission is disclosed. In this control, a speed sensor detects a wheel speed of a driving road wheel drivingly coupled with the continuously variable transmission, and the sensor output, namely a speed indicative signal indicative of the wheel speed detected, is used in conjunction with an engine load indicative signal in deriving a target value in a predetermined reduction ratio dependent variable, such as a turbine speed. Then, an actuator effects a shift in reduction ratio in such a direction as to bring an actual value in the predetermined reduction ratio dependent variable into agreement with the target value. During braking condition, the speed indicative signal may drop to zero or a small value owing to a wheel slip, resulting in a change in target value which causes a shift toward the maximum reduction ratio. For improved recovery from the wheel slip condition upon release of the brake, an estimated vehicle speed is used instead of the speed indicative signal in deriving the target value after the brake has been depressed.

11 Claims, 6 Drawing Sheets

RATIO CONTROL FOR CONTINUOUSLY VARIABLE TRANSMISSION DURING BRAKING

BACKGROUND OF THE INVENTION

The present invention relates to an automotive vehicle with a continuously variable transmission, and more particularly to a ratio control for such a transmission during braking.

U.S. Pat. No. 4,735,113 issued on Apr. 5, 1988 to Yamamuro et al. discloses a ratio control wherein a target value in a reduction ratio dependent variable (a turbine revolution speed) is derived by table look-up of a predetermined shift pattern data based on a wheel speed indicative signal generated by a vehicle speed sensor arranged on a transmission output member drivingly coupled with a driving road wheel and an engine load indicative signal generated by a throttle sensor. During braking, by depression of a brake pedal wherein the wheel speed deviates from the actual vehicle speed, a shift toward the maximum reduction ratio results due to a drop in the wheel speed. This hampers quick recovery of the wheel speed after the brake pedal is released subsequently.

An object of the present invention is to improve a ratio control for a continuously variable transmission such that a quick recovery of wheel speed of a driving road wheel is assured upon release of a brake pedal after braking.

SUMMARY OF THE INVENTION

According to one aspect of the present invention, there is provided an automotive vehicle having a brake pedal, an engine, a continuously variable transmission drivingly connected to the engine and including an actuator for effecting a shift in reduction ration, a driving road wheel drivingly coupled with the continuously variable transmission, a speed sensor generating a speed indicative signal indicative of a wheel speed of the driving road wheel, a control unit operatively coupled with the speed sensor and being operative to use the speed indicative signal at least in deriving a target value in a reduction ratio dependent variable and control the actuator such that an actual value in the reduction ratio dependent variable approaches the target value, wherein the control unit is operative to derive, after the brake pedal has been depressed, an estimated vehicle speed from the speed indicative signal, and use said estimated vehicle speed instead of the speed indicative signal in deriving the target value during a period of time after the brake pedal has been depressed and until the brake pedal is subsequently released.

According to another aspect of the present invention, there is provided a system for a ratio control of a continuously variable transmission drivingly connected to an engine of an automotive vehicle having a brake pedal, the continuously variable transmission including an actuator and being continuously variable in reduction ratio in response to a change in operative of the actuator, the automotive vehicle having a driving road wheel drivingly coupled with the continuously variable transmission, the system comprising:

a speed sensor means for generating a speed indicative signal indicative of a wheel speed of the driving road wheel;

a control unit operatively coupled with said speed sensor and being operative to use said speed indicative signal at least in deriving a target value in a reduction ratio dependent variable and control the actuator such that an actual value in said reduction ratio dependent variable approaches said target value, said control unit being operative to derive, after the brake pedal has been depressed, an estimated vehicle speed from the speed indicative signal, and use said estimated vehicle speed instead of said speed indicative signal in deriving said target value after the brake pedal has been depressed and until the brake pedal is subsequently released.

According to still another aspect of the present invention, there is provided a method of a ratio control of a continuously variable transmission drivingly connected to an engine of an automotive vehicle having a brake pedal, the continuously variable transmission including an actuator and being continuously variable in reduction ratio in response to a change in operative of the actuator, the automotive vehicle having a driving road wheel drivingly coupled with the continuously variable transmission, the method comprising the steps of:

detecting a wheel speed of the driving road wheel and generating a speed indicative signal indicative of a wheel speed of the driving road wheel;

detecting whether or not the brake pedal is depressed and generating a brake application indicative signal indicative of a state when the brake pedal is depressed;

using said speed indicative signal at least in deriving a target value in a predetermined reduction ratio dependent variable;

controlling the actuator such that an actual value in said predetermined reduction ratio dependent variable approaches said target value;

deriving, after said brake application indicative signal has been generated, an estimated vehicle speed from said speed indicative signal;

using said estimated vehicle speed instead of said speed indicative signal in deriving said target value after said brake application indicative signal has been generated and until said brake application indicative signal subsequently disappears.

DETAILED DESCRIPTION OF THE INVENTION

Figure 1:
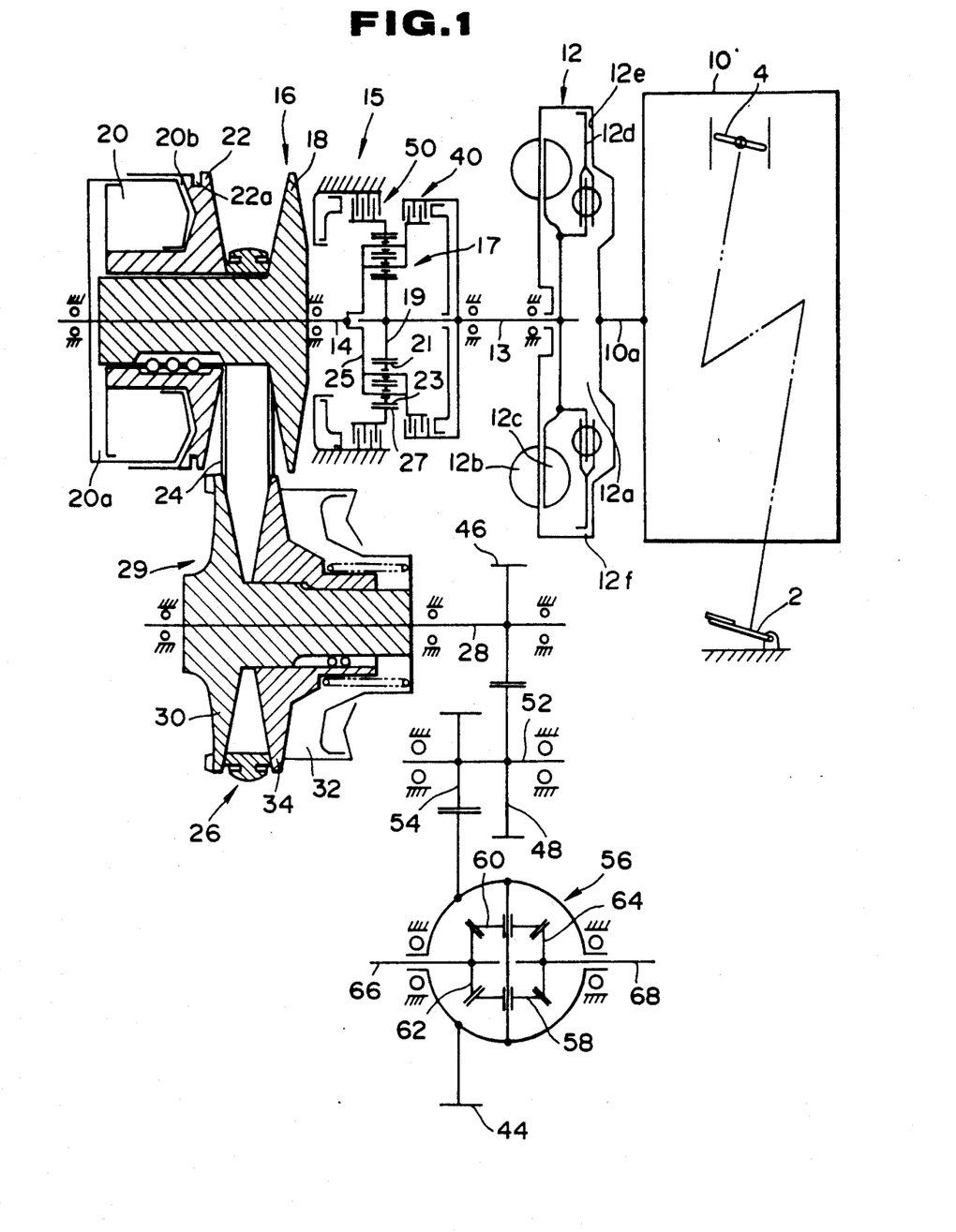
FIG. 1 shows in block diagram an internal combustion engine and a continuously variable transmission having a pair of output axles drivingly coupled with the pair of front wheels of the vehicle shown in FIG. 1A.
Figure 1A:
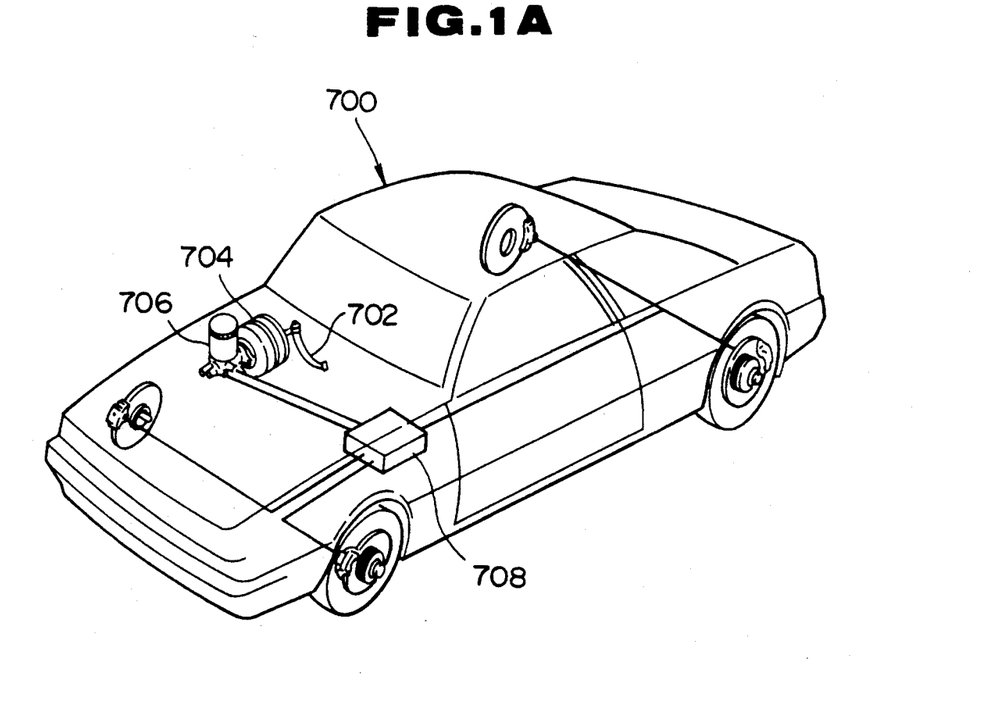
FIG. 1A is a perspective diagram of an automotive vehicle with a pair of front driving wheels and a pair of rear non-driving wheels, illustrating a brake system with a brake pedal.

Referring to FIG. 1A, an automotive vehicle 700 has a pair of front right and left wheels which are driven by an engine 10 via a continuously variable transmission having a pair of output axles 66 and 68 which are drivingly coupled with the pair of front wheels. The automotive vehicle is equipped with a brake system including a brake pedal 702, a booster 704, a master cylinder 706 and a brake actuator 708.

Figure 2A:
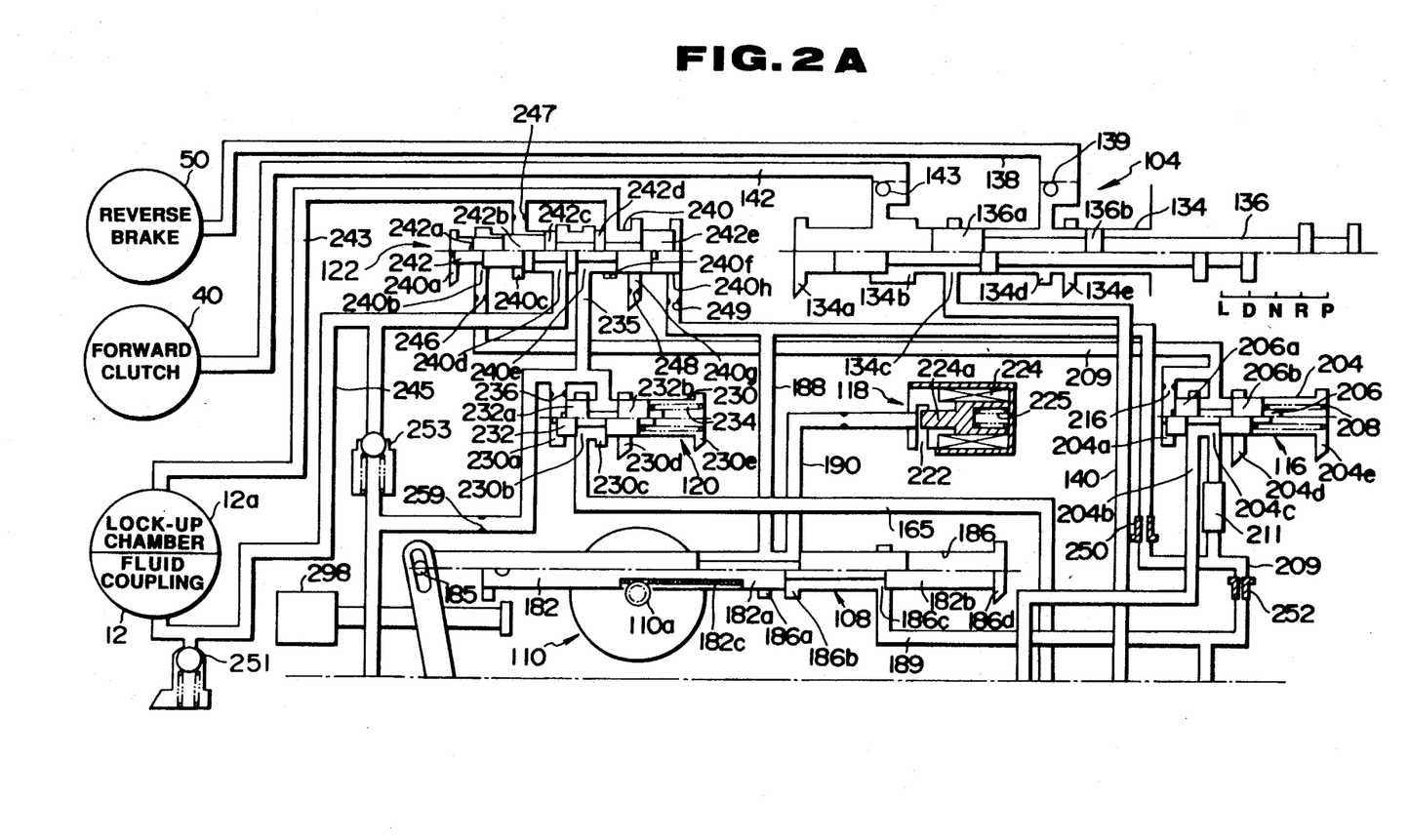
FIGS. 2A and 2B, when combined, are a hydraulic circuit of a control system for the continuously variable transmission.
Figure 2B:
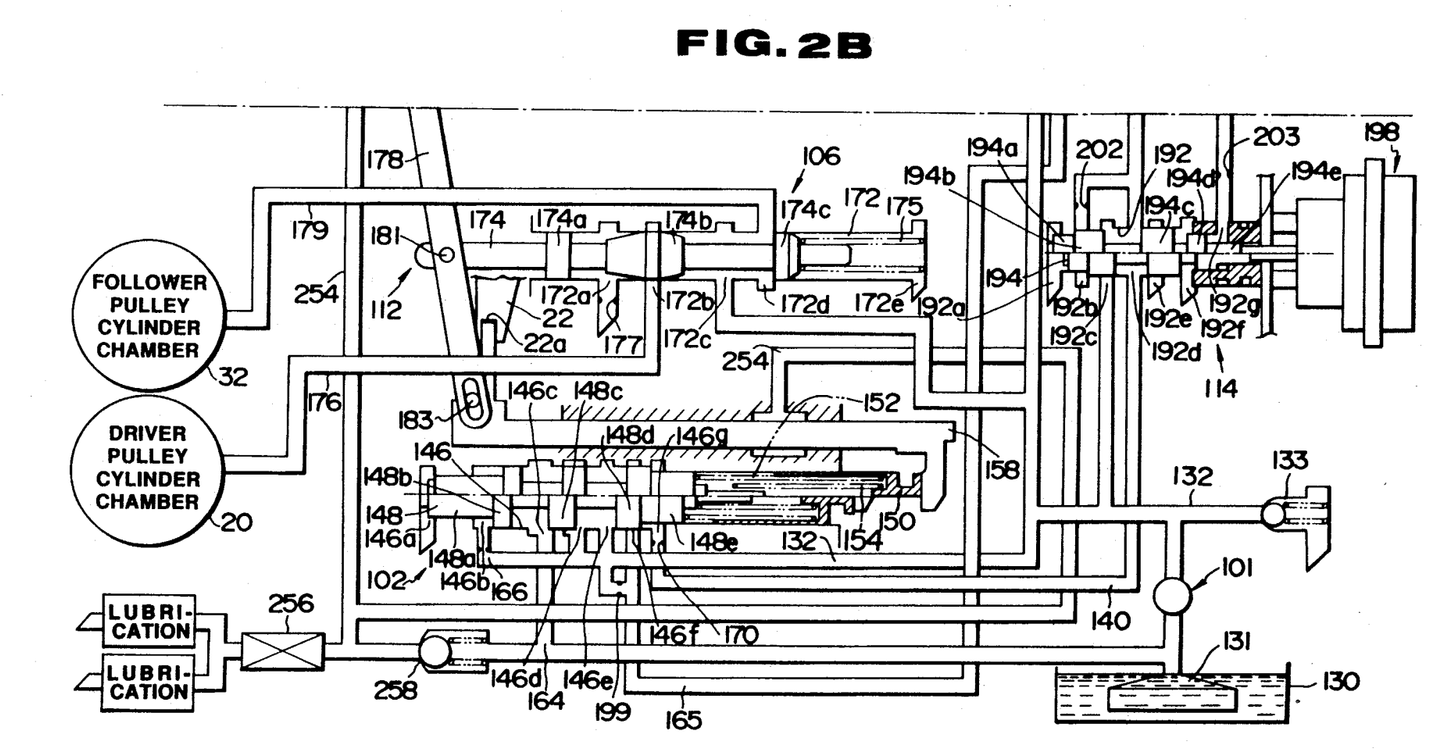
Figure 3:
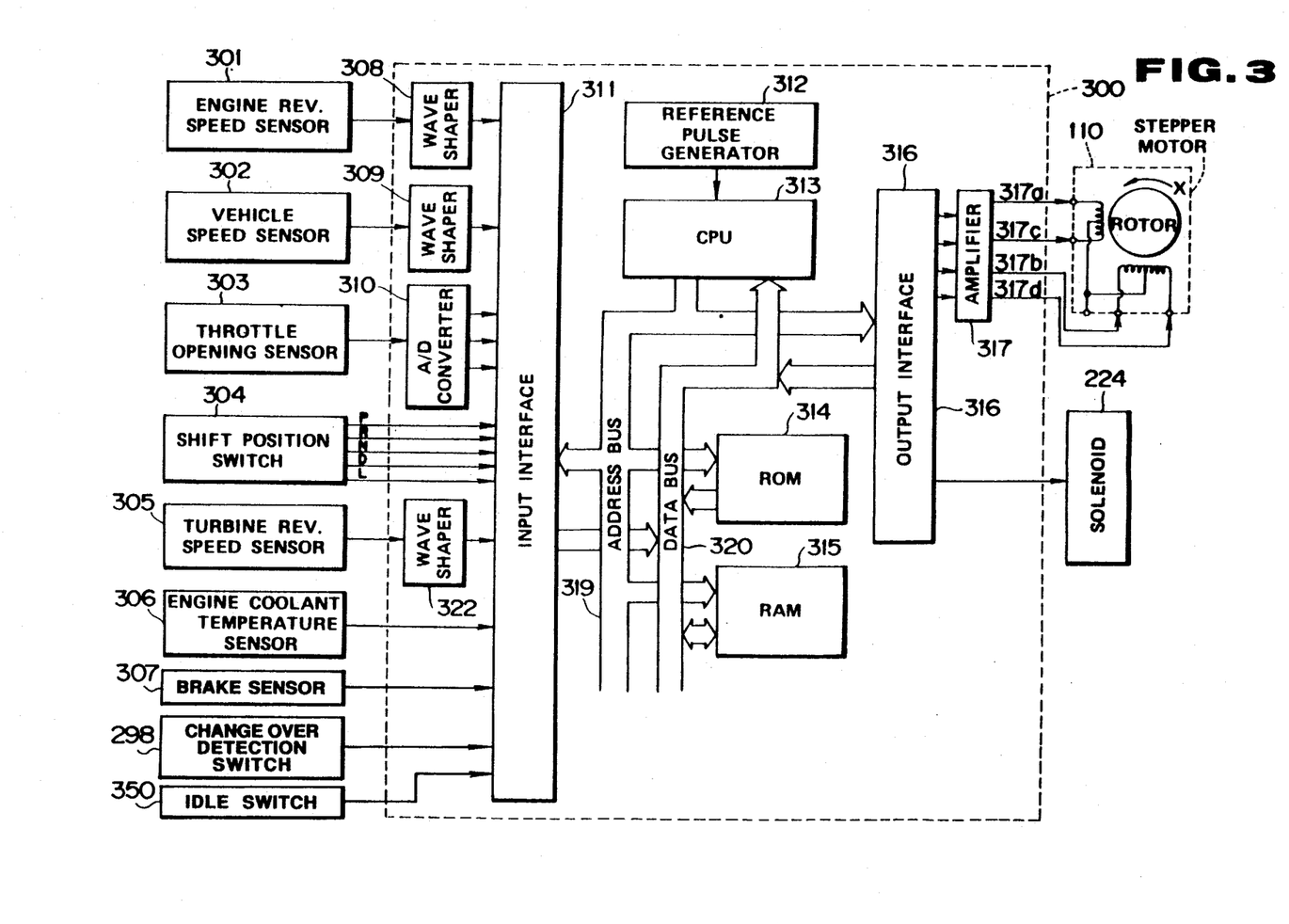
FIG. 3 is a block diagram of a control unit.

Referring to FIG. 1, the internal combustion engine 10 is followed by the continuously variable transmission of the V-belt type. Alternatively, a continusouly variable transmission of the traction drive type may be used. A reduction ratio established in the continuously variable transmission is controlled by a shift actuator in the form of a stepper motor 110 which is under the control of a control unit 300 shown in FIG. 3. In FIGS. 2A and 2B, there is shown a hydraulic circuit of a control system. In FIG. 3, the control unit 300 is shown 7hich is interfaced with a vehicle speed sensor 302 which is a speed sensor mounted to the output member of the transmission. Thus, the speed sensor 302 detects a wheel speed of the driving road wheel and generates a speed indicative signal indicative of the wheel speed. Also coupled with the control unit 300 are a throttle sensor 303 which detects an engine load and generates a load indicative signal indicative of the engine load detected, a turbine speed sensor 305 which detects an actual value in turbine revolution speed and generates a turbine revolution speed indicative signal indicative of the actual value in turbine revolution speed, and a brake sensor 307 which detects whether the brake pedal 702 is depressed and generates a brake application indicative signal when the brake pedal 702 is depressed.

Detailed description of FIGS. 1, 2A, 2B and 3 is found in a copending U.S. patent application Ser. No. 07/563,309 issued as U.S. Pat. No. 5,067,372, filed on Aug. 7, 1990 by the Applicant and assigned to the same assignee to which the present application is to be assigned, which copending application has been hereby incorporated by reference in its entirety. For further undestanting, reference is made to this copending U.S. patent application.

Figure 4:
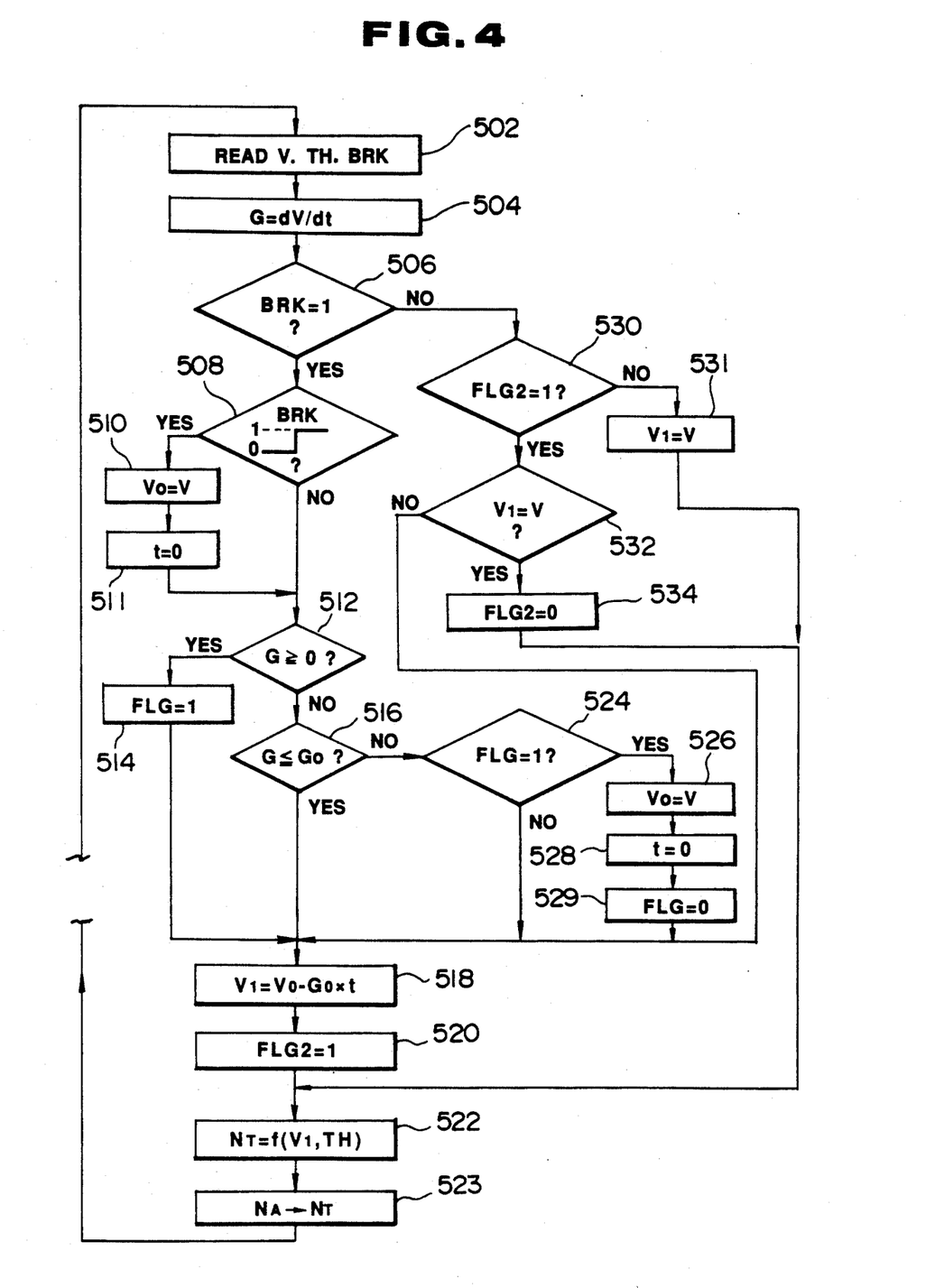
FIG. 4 is a flow diagram.

The operation is explained along with a flow diagram shown in FIG. 4.

Let us now consider that the automotive vehicle is cruising. In this case, the routine proceeds along steps 502, 504, 506, 530, 531, 522 and 523 onwards. At the step 502, there are performed reading operations of sensor outputs of the vehicle speed sensor 302, throttle sensor 303 and brake sensor 307 and results are stored as a speed indicative signal V indicative of a wheel speed of the driving road wheel, an engine load indicative signal TH, and a brake application indicative signal BRK, respectively. The brake application indicative signal assumes one (1) state when the brake pedal is depressed, while it assumes zero (0) state when the brake pedal is released. At the step 504, a first derivative, with respect to time, of the speed indicative signal V is calculated. At the step 506, there is an interrogation whether the brake application indicative signal BRK is generated (BRK=1) or not (BRK=0). Since the brake pedal is released, the routine proceeds to the step 530. At this step 530, there is an interrogation whether a flag FLG2 is set equal to 1 (one) or not. Since this flag FLG2 is reset in this case, the routine proceeds to the step 531 where the speed indicative signal V stored at the previous step 502 is stored as a vehicle speed $V_1$. At the step 522, the vehicle speed data $V_1$ is used in conjunction with the load indicative data TH in deriving a target value $N_T$ in a reduction ratio dependent variable, such as a turbine revolution speed in this embodiment. In deriving the target value $N_T$ in turbine revolution speed, a table look-up operation of a predetermined shift pattern is performed based on the data $V_1$ and TH. At the step 523, the shift actuator in the form of the stepper motor 110 is controlled such that an actual value $N_A$ in turbine revolution speed approaches the target value $N_T$. For fully understanding the manner of deriving the target value and controlling the stepper motor, a reference should be made to the copending U.S. patent application Ser. No. 07/563,309 (issued as U.S. Pat. No. 5,067,372) which has been incorporated by reference in its entirety. Particularly, reference is made to description in connection with FIG. 5 thereof.

Let us now consider how the routine proceeds during a period of time after the brake pedal has been depressed and until the brake pedal is subsequently released.

In the case where there occurs no wheel lock during braking (G>G$_0$), the routine proceeds initially along steps 506, 508, 510, 511, 512, 516, 524, 518 and 520, and subsequenly along steps 506, 508, 512, 516, 524, 518 and 520. The interrogation at the step 506 results in affirmative while the brake pedal is depressed. At the nest step 508, there is an interrogation whether the data BRK has undergone a change from zero to one state during the time interval between the previous run and the present fun of the routine. Since this is the case immediately after the brake pedal has been depressed, the routine proceeds to steps 510 and 511. At the step 510, the speed indicative data V stored at the step 502 is stored as an initial speed value data $V_0$ and at the step 511, a time t of a timer routine is cleared. Although not shown, the increment of the timer t is made by executing the timer routine. After clearing the timer t at the step 511, the routine proceeds to the step 512. At the step 512, there is an interrogation whether or not the first derivative G is greater than or equal to zero. Since this interrogation results in negative, there is another interrogation at the step 516 whether or not the first derivative G is less than or equal to a predetermined negative value $G_0$. Assuming that G is greater than $G_0$, the routine proceeds to the step 524. At the step 524, there is an interrogation whether a flag FLG is set. Since FLG is not set, the routine proceeds to the step 518 where using the initial speed data, the predetermined negative value $G_0$ and the content of timer t, an estimated vehicle speed $V_S$ as expressed by the following equation (1) is derived and the result is stored as the before-mentioned vehicle speed data $V_1$.

$$V_1 = V_S = V_0 - G_0 \times t \qquad (1)$$

After this step 518, the before-mentioned flag FLG2 is set at the step 520.

In the subsequent run after this initial run, the steps 510 and 511 are bypassed and the routine proceeds along the steps 506, 508, 512, 516, 518 and 520. Thus, since the equation (1) is calculated at the step 518, the vehicle speed data $V_1$ (=$V_S$) changes from the initial value at the predetermined negative value with respect to time t elapsed after the instant when the job at the step 511 was carried out.

In the case where there occurs wheel lock owing to a slip during braking, the routine proceeds from the step 516 directly to the step 518. In this case and also in the previously discussed case, the estimated vehicle speed $V_S$ derived at the step 518 is used as the vehicle speed data instead of the speed indicative signal V for subsequent deriving operation of the target value $N_T$ in turbine revolution speed at the step 522. It will be appreciated that the estimated vehicle speed $V_S$ given by calculation of the equation (1) defines a lower limit which the vehicle speed data $V_1$ is allowed to assume. Thus, even if the first derivative of the vehicle speed indicative signal drops below the predetermined negative value, a shift toward the maximum reduction ratio is restrained. The tendency that the wheel is locked is alleviated.

Let us now consider the case where the first derivative G of the vehicle speed indicative signal V increases to zero or becomes positive during braking. In this case, the routine proceeds from the step 512 to a step 514 where the flag FLG is set (FLG=1). Thereafter, if the first derivative G becomes negative again but still greater than the predetermined negative value $G_0$, the routine proceeds along the steps 516 and 524 to a step 526. At this step 526, the vehicle speed data V stored at the step 502 is stored as the initial speed value data $V_0$. In other words, the initial speed value data $V_0$ is renewed at this step 526. After this renewal step 526, the routine proceeds to steps 528 and 529 where the timer t is cleared and flag FLG is reset. Thereafter, the calculation at the step 518 is performed with this new initial speed value data $V_0$ and content of the timer t.

If, subsequently, the brake pedal is released, the routine may proceeds directly to the step 531. Preferrably, as illustrated in FIG. 4, the routine proceeds along the steps 530, 532 and 518 even after the brake pedal has been released 506 until the vehicle speed indicative signal V satisfies a predetermined relationship with the estimated vehicle speed $V_S$ ($=V_1$ in this case). At the step 532, there is an interrogation whether V is equal to $V_1$ ($=V_S$). If this is the case, the flag FLG2 is reset at a step 534. Subsequently, since the interrogation at the step 530 results in negative, the routine proceeds to the step 531 and the speed indicative signal V is used again in deriving the target value $N_T$ in turbine revolution speed at the step 522. These proceedings are advantageous in improving performance of recovery from wheel lock braking.

Although in the above flow diagram, the estimation is made by calculating the equation (1) at the step 518 during braking, this estimation may be made by interpolation of upper peaks of the speed indicative signal V. The estimation by interpolation is effective if the automative vehicle is equipped with a so-called anti-lock brake system (ABS).

What is claimed is:

1. An automotive vehicle having a brake pedal, an engine, a continuously variable transmission drivingly connected to the engine and including an actuator for effecting a shift in reduction ratio, a driving road wheel drivingly coupled with the continuously variable transmission, a speed sensor generating a speed indicative signal indicative of a wheel speed of the driving road wheel, a throttle sensor generating a load indicative signal indicative of a load on the engine, a control unit operatively coupled with the speed sensor and the throttle sensor and being operative to use the speed indicative signal and the load indicative signal in deriving a target value in a reduction ratio dependent variable and to control the actuator such that an actual value in the reduction ratio dependent variable approaches the target value, wherein the control unit is operative to derive, after the brake pedal has been depressed, an estimated vehicle speed from the speed indicative signal, and use said estimated vehicle speed instead of the speed indicative signal in deriving the target value after the brake pedal has been depressed and until the brake pedal is subsequently released.

2. An automotive vehicle as claimed in claim 1, wherein the control unit is operative to use the speed indicative signal in deriving the target value after the brake pedal has been subsequently released.

3. An automotive vehicle as claimed in claim 1, wherein the control unit is operative to use, after the brake pedal has been subsequently released, the speed indicative signal in deriving the target value when the speed indicative signal satisfies a predetermined relationship with said estimated vehicle speed.

4. An automotive vehicle as claimed in claim 1, wherein the control unit includes
means for calculating a first derivative, with respect to time, of the speed indicative signal and generating a first derivative indicative signal indicative of said first derivative of the speed indicative signal;
means for storing, as an initial speed value data, said speed indicative signal generated at a predetermined instant after the brake pedal has been depressed;
means for deriving said estimated vehicle speed from said initial vehicle speed value data, said first derivative indicative signal and a lapse of time after said predetermined instant.

5. An automotive vehicle as claimed in claim 4, wherein the control unit further comprises:
means for interrogating whether said first derivative indicative signal is not greater than a predetermined negative value and generating a comparison result indicative signal when said first derivative indicative signal is not greater than said predetermined negative value;
means for interrogating whether said first derivative indicative signal is not less than zero;
means for setting a predetermined flag when said first derivative indicative signal is not less than zero;
means for interrogating whether said predetermined flag is set;
means for restoring, as said initial vehicle speed value data, said vehicle speed indicative signal generated when said predetermined flag is set and said first derivative indicative signal is less than zero but greater than said predetermined negative value.

6. A system for a ratio control of a continuously variable transmission drivingly connected to an engine of an automotive vehicle having a brake pedal, the continuously variable transmission including an actuator and being continuously variable in reduction ratio in response to a change in operative of the actuator, the automotive vehicle having a driving road wheel drivingly coupled with the continuously variable transmission, the system comprising:
a speed sensor means for generating a speed indicative signal indicative of a wheel speed of the driving road wheel;
a throttle sensor means for generating a load indicative signal indicative of a load on the engine;
a control unit operatively coupled with said speed sensor means and said throttle sensor means and being operative to use said speed indicative signal at least in deriving a target value in a reduction ratio dependent variable and control the actuator such that an actual value in said reduction ratio dependent variable approaches said target value,
said control unit being operative to derive, after the brake pedal has been depressed, an estimated vehicle speed from the speed indicative signal, and use said estimated vehicle speed instead of said speed indicative signal in deriving said target value after the brake pedal has been depressed and until the brake pedal is subsequently released.

7. A method of a ratio control of a continuously variable transmission drivingly connected to an engine of an automotive vehicle having a brake pedal, the continuously variable transmission including an actuator and being continuously variable in reduction ratio in response to a change in operative of the actuator, the automotive vehicle having a driving road wheel drivingly coupled with the continuously variable transmission, the method comprising the steps of:

- detecting a wheel speed of the driving road wheel and generating a speed indicative signal indicative of the detected wheel speed of the driving road wheel;
- deriving a load on the engine and generating a load indicative signal indicative of the detected load on the engine;
- detecting whether or not the brake pedal is depressed and generating a brake application indicative signal indicative of a state when the brake pedal is depressed;
- using said speed indicative signal and said load indicative signal in deriving a target value in a reduction ratio dependent variable;
- controlling the actuator such that an actual value in said reduction ratio dependent variable approaches said target value;
- deriving, after said brake application indicative signal has been generated, an estimated vehicle speed from said speed indicative signal;
- using said estimated vehicle speed instead of said speed indicative signal in deriving said target value after said brake application indicative signal has been generated and until said brake application indicative signal subsequently disappears.

8. A method as claimed in claim 7, wherein said step of deriving said estimated vehicle speed includes the substeps of:

- calculating a first derivative, with respect to time, of said speed indicative signal and generating a first derivative indicative signal indicative of said first derivative of said speed indicative signal;
- storing, as an initial speed value data, said speed indicative signal generated at a predetermined instant after said brake application indicative signal has been generated; and
- deriving said estimated vehicle speed from said initial vehicle speed value data, said first derivative indicative signal and a lapse of time after said predetermined instant.

9. A method as claimed in claim 8, wherein said step of deriving said estimated vehicle speed includes the substeps of:

- interrogating whether said first derivative indicative signal is not greater than a predetermined negative value and generating a comparison result indicative signal when said first derivative indicative signal is not greater than said predetermined negative value;
- interrogating whether said first derivative indicative signal is not less than zero;
- setting a predetermined flag when said first derivative indicative signal is not less than zero;
- interrogating whether said predetermined flag is set; and
- restoring, as said initial vehicle speed value data, said vehicle speed indicative signal generated when said predetermined flag is set and said first derivative indicative signal is less than zero but greater than said predetermined negative value.

10. A method as claimed in claim 9, including the step of:

using said speed indicative signal in deriving said target value after said brake application indicative signal has subsequently disappeared.

11. A method as claimed in claim 9, including the step of:

using, after said brake application indicative signal has subsequently disappeared, said speed indicative signal in deriving said target value when said speed indicative signal satisfies a predetermined relationship with said estimated vehicle speed.

* * * * *